United States Patent
Lee et al.

(10) Patent No.: US 7,978,651 B2
(45) Date of Patent: Jul. 12, 2011

(54) INTERNAL DATA STRUCTURE OF MOBILE TERMINAL FOR QOS-BASED UPLINK DATA TRANSMISSION, AND OPERATIONAL METHODS THEREOF

(75) Inventors: Seung-Que Lee, Daejeon (KR); June-Bae Seo, Daejeon (KR); Nam-Hoon Park, Daejeon (KR)

(73) Assignees: Samsung Electronics Co., Ltd. (KR); Electronics and Telecommunications Research Institute (KR); KT Corporation (KR); SK Telecom Co., Ltd. (KR); KTFREETEL Co., Ltd. (KR); Hanaro Telecom, Inc. (KR)

( * ) Notice: Subject to any disclaimer, the term of this patent is extended or adjusted under 35 U.S.C. 154(b) by 1146 days.

(21) Appl. No.: 11/663,676

(22) PCT Filed: May 17, 2005

(86) PCT No.: PCT/KR2005/010435
§ 371 (c)(1),
(2), (4) Date: Mar. 22, 2007

(87) PCT Pub. No.: WO2006/033514
PCT Pub. Date: Mar. 30, 2006

(65) Prior Publication Data
US 2009/0196276 A1  Aug. 6, 2009

(30) Foreign Application Priority Data
Sep. 22, 2004  (KR) .................. 10-2004-0075830

(51) Int. Cl.
H04W 4/00 (2009.01)
H04J 3/16 (2006.01)
H04J 3/24 (2006.01)

(52) U.S. Cl. .................. 370/329; 370/468; 370/474

(58) Field of Classification Search .................. 370/310, 370/329, 328, 331, 336, 338, 347, 389, 458, 370/465, 410, 401, 474, 395.1, 395.6, 397, 370/344
See application file for complete search history.

(56) References Cited

U.S. PATENT DOCUMENTS
6,104,700 A  8/2000 Haddock et al.
(Continued)

FOREIGN PATENT DOCUMENTS
EP  1 388 954 A2  11/2004
(Continued)

OTHER PUBLICATIONS

Office Action issued in Japanese Application No. 2002-269795 dated May 29, 2007.

*Primary Examiner* — Nittaya Juntima
*Assistant Examiner* — Samina Choudhry
(74) *Attorney, Agent, or Firm* — The Farrell Law Firm, P.C.

(57) ABSTRACT

A recording medium having an internal data structure for uplink data transmission based on QoS in a mobile terminal of an OFDMA/TDMA-based high-speed portable Internet system, the internal data structure comprising a connection identifier index indicating a predetermined connection of the mobile terminal; a service class index indicating QoS classes of uplink data; a control channel index indicating a type of a control channel for transmission of a management message of the mobile terminal; an access type index indicating a type of access for a bandwidth request of the mobile terminal; a user packet list having IP packets linked to each other through a linked list; a management message list having the management messages linked to each other through a linked list; and a bandwidth request list having informative elements that are linked to each other for the bandwidth request through a linked list.

6 Claims, 4 Drawing Sheets

U.S. PATENT DOCUMENTS

| | | | |
|---|---|---|---|
| 6,640,248 B1 * | 10/2003 | Jorgensen | 709/226 |
| 6,744,767 B1 | 6/2004 | Chiu et al. | |
| 6,766,167 B2 * | 7/2004 | Tung et al. | 455/432.1 |
| 7,184,440 B1 * | 2/2007 | Sterne et al. | 370/395.52 |
| 7,266,087 B2 * | 9/2007 | Wahl | 370/252 |
| 7,305,492 B2 * | 12/2007 | Bryers et al. | 709/249 |
| 7,499,425 B2 * | 3/2009 | Yew et al. | 370/329 |
| 2005/0096063 A1 * | 5/2005 | Muniere | 455/452.2 |

FOREIGN PATENT DOCUMENTS

| | | |
|---|---|---|
| JP | 7-193646 | 7/1995 |
| JP | 9-38267 | 2/1997 |
| JP | 10-145733 | 5/1998 |
| JP | 10-215434 | 8/1998 |
| JP | 2002-24229 | 1/2002 |
| JP | 2003-219415 | 7/2003 |
| KR | 1020020055358 A | 7/2002 |

* cited by examiner

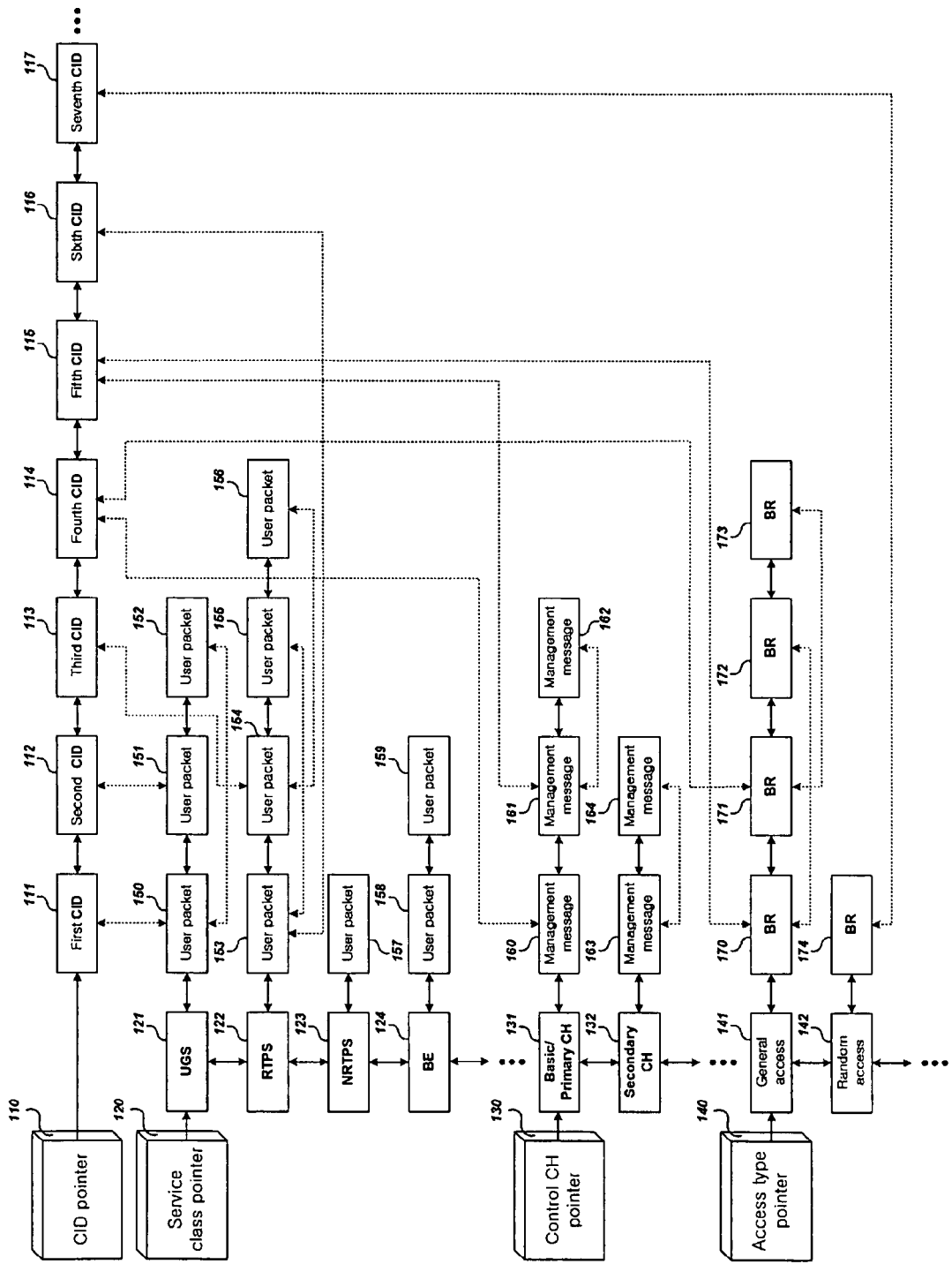
[Fig. 1]

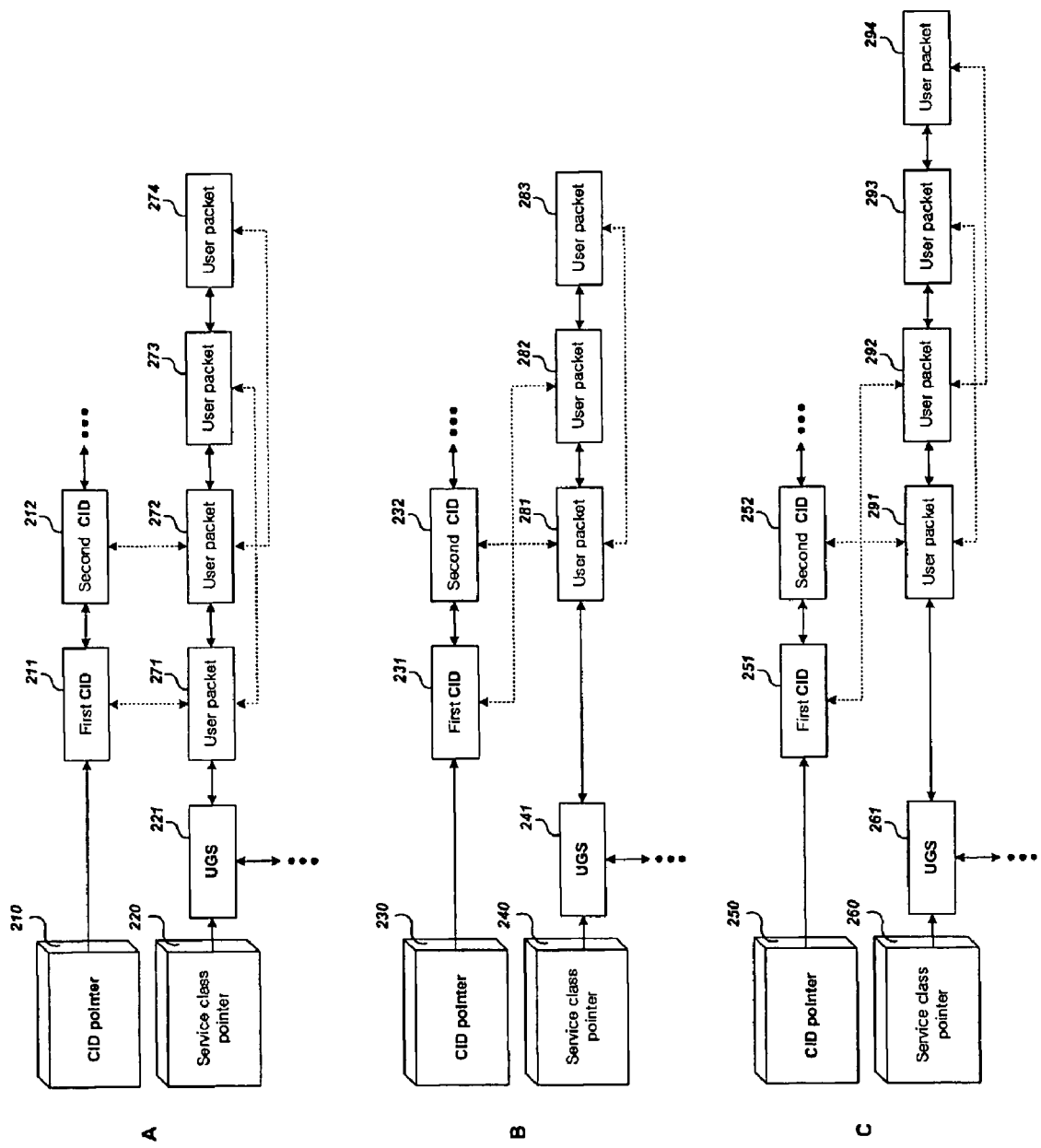
[Fig. 2]

[Fig. 3]
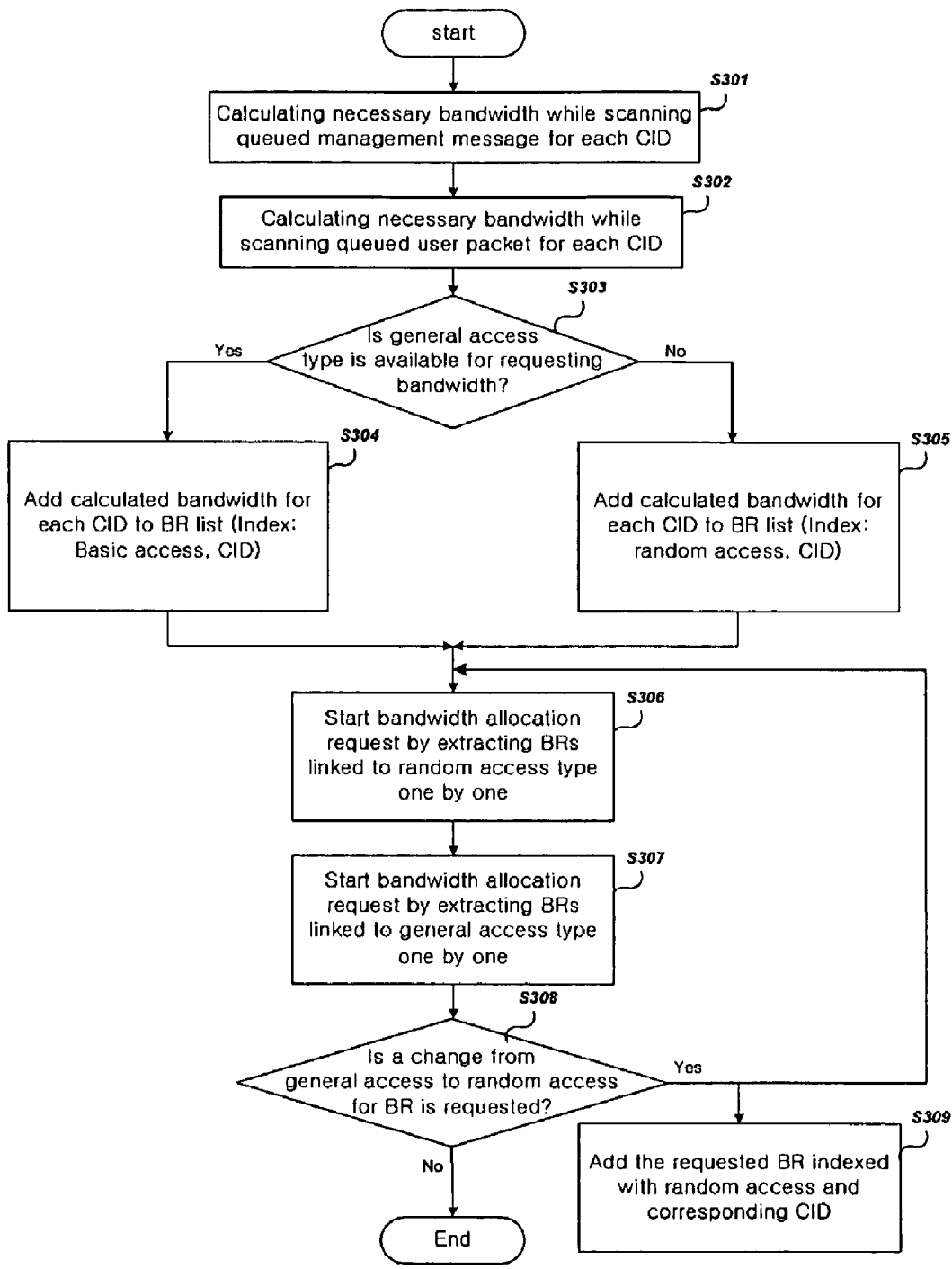

[Fig. 4]
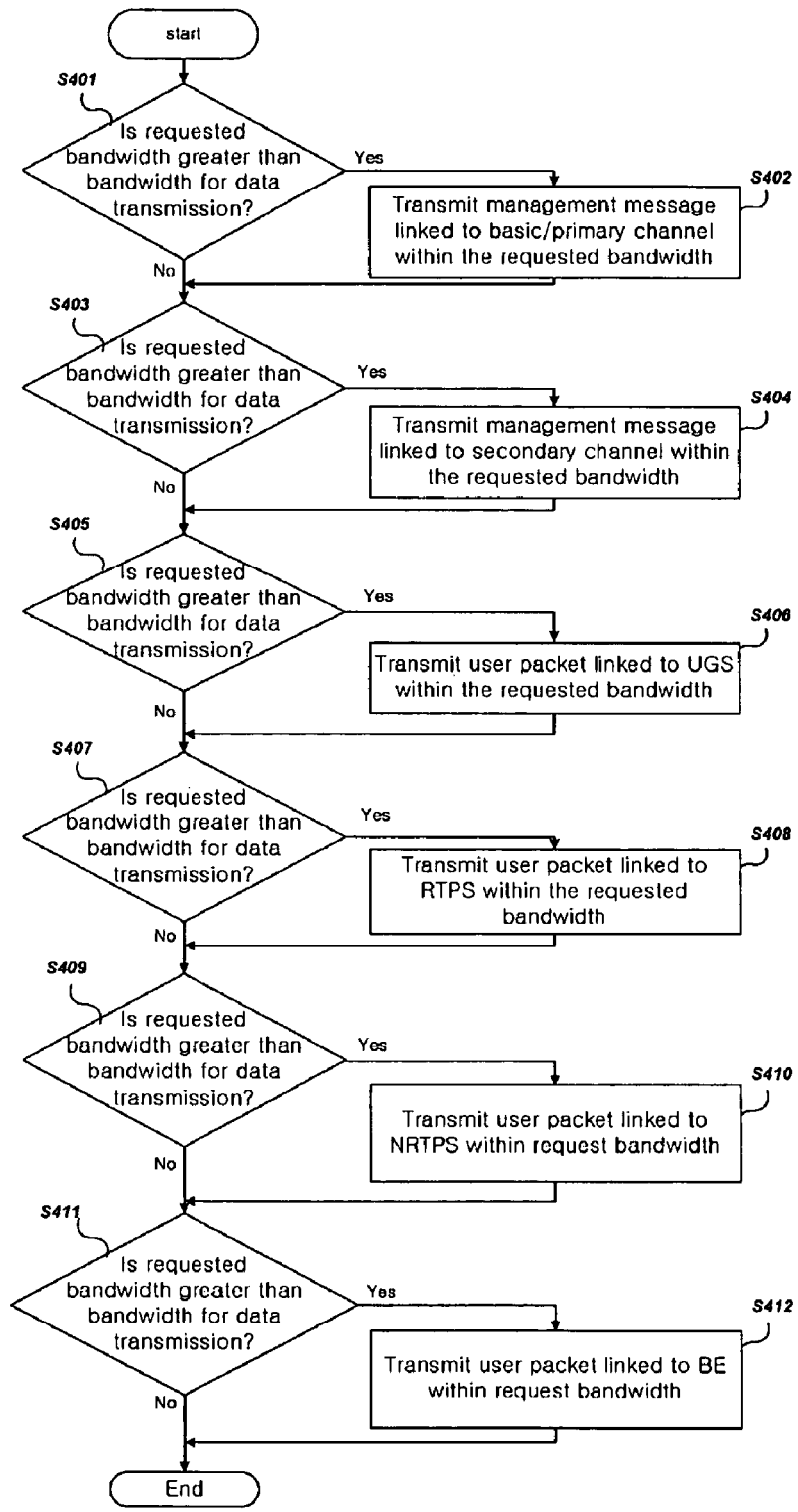

INTERNAL DATA STRUCTURE OF MOBILE TERMINAL FOR QOS-BASED UPLINK DATA TRANSMISSION, AND OPERATIONAL METHODS THEREOF

TECHNICAL FIELD

The present invention relates to an internal data structure of a mobile terminal for quality of service (QoS)-based uplink data transmission, and operational methods thereof. More particularly, the present invention relates to a data queue structure of the mobile terminal for QoS-based uplink data transmission in an OFDMA-TDMA based high-speed portable Internet HPi.

BACKGROUND ART

A high-speed portable Internet (HPi) system employs the orthogonal frequency division multiplexing (OFDM) for modulation/demodulation and the frequency division multiple access (FDMA)/time division multiple access (TDMA) for user multiplexing. Such an HPi system has a base station (BS) as a coordinator that manages and schedules a bandwidth. Thus, when a mobile terminal requests the BS to allocate a bandwidth for data transmission, the BS allocates the corresponding bandwidth and the mobile terminal transmits data using the allocated bandwidth.

Methods for requesting a bandwidth include a basic access request and a random access request. The basic access request is not a contention-based request, and thus the mobile terminal piggybacks the data on a unicast-based bandwidth or a leftover bandwidth within a given bandwidth in response to polling of the BS. However, the random access request is a contention-based request and thus multiple users request bandwidth allocation by competing with each other for one dedicated channel.

Uplink traffic is classified into four service classes: an unsolicited grant service (UGS), a real time polling service (RTPS), a non real time polling service (NRTPS), and a best effort (BE). The UGS is designated, for periodic transmission of fixed size data such as the voice over Internet Protocol (VoIP), the RTPS for periodic transmission of variable size data such as the motion picture experts group (MPEG) video, the NRTPS for period transmission of variable data bursts (i.e., the file transfer protocol (FTP)), and the BE for traffic having lower priority such as mailing and web-browsing.

The above-noted service classes establish connections between the mobile terminal and the BS by applying QoS parameters such as delay, jitter, error rate, and so on. The connections may be varied depending on the QoS parameters, and each connection is defined by a connection identifier (CID).

When the mobile terminal receives a packet transmission request from an application program to request a bandwidth from the BS, and the BS grants an available bandwidth so that the mobile terminal may guarantee the bandwidth. The mobile terminal then transmits the packet through the granted bandwidth.

In the bandwidth request/grant, the BS receives bandwidth allocation requests form the mobile terminal for each connection, but allocates bandwidths to all the mobile terminals in order to overcome the problem in which the BS fails to control the case in which the mobile terminal continuously generates traffic when the BS receives the bandwidth request and allocates bandwidth to the mobile terminal.

The mobile terminal performs a different operation according to a QoS characteristic of the established connection when requesting a bandwidth from the BS and using the same.

User packets of the mobile terminal are classified into four service classes and stored therein. The mobile terminal requests the bandwidth for the stored packets from the BS, and transmits the stored packets according to a priority-based QoS policy when guaranteeing the bandwidth.

Uplink data includes a management message in addition to the user packets. When a bandwidth is requested and then guaranteed, the management message is transmitted therethrough. The management message is classified into a basic/primary CH class and a secondary CH class according to attributes of the management messages. The basic CH class has the highest priority and the secondary CH class has the lowest priority.

Similar to the way of transmitting the user packets, the management message is classified into three services and stored in the mobile terminal when management message transmission is requested. When the bandwidth requested to the BS for transmitting the stored management messages is guaranteed, the stored management messages are transmitted according to the priority-based QoS policy.

When both of the management message and the user packet are stored in the mobile terminal, the management message is transmitted with, priority higher than the user packet since the management message is a control message related to operation of the HPi system and is thus more important than the user packet.

As a prior art, a medium access control (MAC) device in a network system employing division multiplexing has been disclosed in the Korean Patent Application No. 10-2001-63665 filed on Oct. 16, 2001 (entitled "Media access control device with QoS of a network system introducing a way of wavelength division multiplexing").

In more detail, the MAC device includes: a packet receiver exclusively receiving packets that are sequentially flowing to a temporary node through mini slots, and selectively storing/outputting the corresponding packet according to destined nodes; a packet transmitter transmitting a sequence of packets to be transmitted using the mini slots passed via the packet receiver; a queue storing the sequence of packets; a priority-based queue temporarily storing a specific packet selected by, the packet receiver; and a queue manager prioritizing data in the queue storing the packets to be received and in the priority-based queue, and controlling the packet transmitter to transmit the data in a prioritized order. The disclosed invention also provides, a priority managing structure to manage data transmission by comparing priority between the data temporality stored in the queue and the data stored in the priority-based queue to thereby prevent transmission delay of data having lower priority and simultaneous data transmission (data collision) with other stations.

As another prior art, the U.S. Pat. No. 6,640,248 filed on Jul. 9, 1999 discloses "Application-aware, quality of service (QoS) sensitive, media access control (MAC) layer".

In more detail, the prior art provides an application-aware resource allocator to specify application programs sensitive to IP Flows (Transmission Control Protocol Flow, and User Datagram Protocol Flow), allocate the corresponding resource, analyze a header of a start packet of each flow, and distinguish characteristics of each application program to thereby control QoS in consideration of the characteristics of the application programs.

In addition, the U.S. Pat. No. 6,104,700 filed on Feb. 3, 1998 discloses "Policy based quality of Service." This invention is related to a method for controlling a policy based quality of service for managing, monitoring, and prioritizing traffic within a network.

In more detail, the foregoing invention selectively transmits data packets by using a traffic group generated when receiving the packet so as to flexibly control priority-based QoS policy for dynamic bandwidth allocation.

However, in a conventional portable Internet system, the mobile terminal cannot efficiently transmit uplink data because a queue for user packet/management message, bandwidth allocation for the user packet/management message, and data transmission based on priority of the QoS are not properly managed.

DISCLOSURE OF INVENTION

Technical Problem

It is an advantage of the present invention to provide an internal data structure for uplink data transmission according to priority-based quality of service such that a mobile terminal of a portable Internet system efficiently manages a bandwidth.

In addition, the uplink data are classified according to characteristics of the data, and stored having linked connections, to extract the classified data as necessary for efficient bandwidth management and priority management.

Technical Solution

In one aspect of the present invention, there is provided a recording medium having an internal data structure for uplink data transmission based on quality of service (QoS) in a mobile terminal of an orthogonal frequency division multiple access (OFDMA)/time division multiple access (TDMA)-based high-speed portable Internet (HPi) system. The internal data structure includes a connection identifier (CID), a service class index, a control channel index, an access type index, a user packet list, a management message list, and a bandwidth request list. The CID index indicates a predetermined connection of the mobile terminal. The service class index indicates QoS classes of uplink data. The control channel index indicates a type of a control channel for transmission of a management message of the mobile terminal. The access type index indicates a type of access for a bandwidth request of the mobile terminal. The user packet list has Internet Protocol (IP) packets linked to each other through a linked list. The management message list has the management messages linked to each other through a linked list. The bandwidth request list has informative elements that are linked to each other for the bandwidth request through a linked list.

The CID index, the service class index, the control channel index, and the access type index may respectively have a pointer pointing a first element of each list that is provided for classifying uplink data of the mobile terminal.

The CID index, the service class index, the control channel index, and the access type-index may form double-linked lists, respectively.

The user packet list, the management message list, and the bandwidth request list may enable addition and deletion of elements in the respective lists.

The service class index may include an unsolicited grant service (UGS), a real time polling service (RTPS), a non real time polling service (NRTPS), and a best effort (BE) according to priority-based QoS.

The control channel index may include information on a basic/primary channel and a secondary chancel for transmission of the management message of the mobile terminal.

The access type index may include a general access type and a random access type for the bandwidth request of the mobile terminal.

The user packet may be double-linked to the corresponding CID index and service class index when configuring the uplink data of the mobile terminal.

The management message may be double-linked to the corresponding CID index and control channel index when configuring the uplink data of the mobile terminal.

The bandwidth request message may be double-linked to the corresponding CID index and access type index when configuring the uplink data of the mobile terminal.

Modification of one of the two double-linked lists may cause another double-linked list to be modified when adding and deleting the user packet, the management message, and the bandwidth request message.

In another aspect of the present invention, there is provided a method for managing bandwidth for quality of service (QoS)-based uplink data transmission of a mobile terminal in an orthogonal frequency division multiple access (OFDMA)/time division multiple access (TDMA)-based high-speed portable Internet (HPi) system. The method includes a) calculating a desired bandwidth for each connection identifier (CID) while scanning management messages queued in the mobile terminal; b) calculating a desired bandwidth for each CID while scanning user packets queued in the mobile terminal; c) identifying a bandwidth request for each CID as a general access type or a random access type, and storing the bandwidth request in a bandwidth request list; d) performing the bandwidth requests stored in the random access type bandwidth request list prior to performing the bandwidth request stored in the general access type bandwidth request list; and e) re-performing bandwidth request when the type of bandwidth request is changed from the general access type to the random access type.

In the method, e) may include e-1) checking whether an access type change from the general access type to the random access type is requested; e-2) when the access type change is requested, the random access type becomes an index for the corresponding bandwidth request and is stored in a queue; and e-3) re-performing the bandwidth request by employing the random access type stored in the queue.

In further another aspect of the present invention, there is provided a method for managing priority of quality of service (QoS)-based uplink data transmission of a mobile terminal in an orthogonal frequency division multiple access (OFDMA)/time division multiple access (TDMA)-based high-speed portable Internet (HPi) system. The method includes a) comparing a size of a bandwidth requested by the mobile terminal and a size of a transmitted management message; b) when the size of the requested bandwidth is greater than that of a bandwidth for data transmission, transmitting the management message within the requested bandwidth according to priority; c) comparing a size of a bandwidth requested by the mobile terminal and a size of a transmitted user packet; and d) when the size of the requested bandwidth is greater than that of a bandwidth for data transmission, transmitting the user packet within the requested bandwidth according to priority.

In b), the management message linked to a basic/primary channel may be transmitted prior to the management message linked to a secondary channel.

In d), the user packets may be transmitted in order of an unsolicited grant service (UGS), a real time polling service (RTPS), a non real time polling service (NRTPS), and a best effort service (BE).

Advantageous Effects

Therefore, uplink data transmission in the MAC layer of the mobile terminal may be designed and implemented in an OFDMA/TDMA-based portable Internet system according to the embodiments of the present invention.

In addition, the uplink data are linked and stored by their characteristics, and extracted to be used for managing bandwidth and priority as necessary to thereby efficiently transmit the QoS-based uplink data transmission.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 1 illustrates a data structure of a queue of a queue manager in a mobile terminal according to an embodiment of the present invention.

FIG. 2 illustrates a link change when a user packet is added or deleted in the queue according to an embodiment of the present invention.

FIG. 3 illustrates an operational flowchart of a bandwidth manager of the mobile terminal according to an embodiment of the present invention.

FIG. 4 illustrates an operational flowchart of a priority manager of the mobile terminal according to an embodiment of the present invention.

BEST MODE FOR CARRYING OUT THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

An internal data structure of a mobile terminal for quality of service (QoS)-based uplink data transmission and operational methods thereof will be described in more detail with reference to the accompanied drawings.

According to an embodiment of the present invention, an internal data structure and a method for managing a queue, bandwidth, and priority are provided for uplink data transmission in the orthogonal frequency division multiple access (OFDMA)/time division multiple access (TDMA)-based portable Internet system.

In more detail, the internal data structure of the queue is designed to classify and store uplink data according to characteristics of the data and methods are provided for managing a bandwidth of the mobile terminal based on the queue and a priority-based QoS policy. The internal data structure enables characteristic-sensitive data extraction.

FIG. 1 shows a data structure of a queue of a queue manager in the mobile terminal according to an embodiment of the present invention. The queue is a core data structure, and commonly used by the queue manager, a bandwidth, manager, and a priority manager for their operations.

Referring to FIG. 1, the queue of the queue manager includes a connection identifier (CID) pointer 110, a service class pointer 120, a control channel (CH) pointer 130, an access type pointer 140, and indexes indicating first elements of the respective pointers. The queue of the queue manager may also include a user packet list, a management message list, and a bandwidth request list.

The CID pointer 110 informs a start of CID lists 111 to 117. Herein, each CID in the CID lists 111 to 117 is double-linked to a predetermined connection of the mobile terminal. A CID may be added or deleted in the CID lists 111 to 117 in association with the predetermined connection.

The service class pointer 120 informs a start of the service class lists 121 to 124. The service class lists 121 to 124 are double-linked with service classes indicating priority-based QoS of the respective service classes of the uplink of the mobile terminal. The service classes include an unsolicited grant service (UGS) 121, a real time polling service (RTPS) 122, a non real time polling service (NRTPS) 123, and a best effort (BE) 124, as already described. A structure of the elements enables addition and deletion of service classes.

The control CH pointer 130 informs a start of control CH class lists 131 and 132. The control CH class lists 131 and 132 are double-linked with types of control CHs for the mobile terminal to transmit the management message. The types include a basic/primary CH 131 and a secondary CH 132. A structure of the control CHs enables addition and deletion of a CH in a similar way to the case of the service class lists 121 to 124.

The access type pointer 140 informs a start of access type lists 141 and 142. The access type lists 141 and 142 are double-linked with access types indicating a general access 141 and a random access 142. A structure of the access type pointer 140 enables addition and deletion of a bandwidth request (BR) in a similar way of the case of the service class lists.

User packet lists 150 to 159, connected with each other by Internet Protocol (IP) packets of an upper IP layer, are double-linked with the corresponding service class and the corresponding CID. Thus, the user packets are controlled by the service classes and the CIDs. For example, the user packets 150, 151, and 152 are linked to the UGS service class 121, and the user packets 150 and 152 are linked to the first CID 111. In addition, the user packet 151 is linked to the second CID 112. Therefore, the user packets 150 to 159 are added/updated/deleted for each service class or CID.

Management message lists 160 to 164 are formed by MAC management messages in the double-link connections with the respective control CH classes and the respective CIDs. For example, the management messages 160, 161, and 162 are linked to the basic/primary CH class 131. Herein, the management message 160 is double-linked to the fourth CID 114, and the management messages 161 and 162 are double-linked to the fifth CID 115. Therefore, the management messages 161 to 164 are added/updated/deleted for each service class or CID, as necessary.

Similar to the user packet lists 150 to 159, bandwidth request (BR) lists 170 to 174 are formed by BRs in the double-linked connections respectively forwarding in two directions: the access types and the CIDs. For example, the BRs 170, 171, 172, and 173 are linked to the general access type 141. Herein, the BRs 170 and 172 are double-linked to the fifth CID 115, and BRs 171 and 173 are double-linked to the fourth CID 114. Therefore, the BRs 170 to 174 are added/updated/deleted for each access type or CID.

FIG. 2 illustrates a change of links when a user packet is deleted from or added to the queue list according to an embodiment of the present invention.

Referring to FIG. 2, user packets 271 to 274 are double-linked with a service class 221 and CIDs 211 and 212, and therefore it is preferred to process addition or deletion of the user packet in consideration of the connections with the service class 221 and the CIDs 211 and 212.

In a state of A in FIG. 2, the user packets 271 and 273 are double-linked with the first CID 211 and the UGS 221. When the user packet 271 is deleted, a first CID 231 is to be indicating a next user packet 282 and the UGS 241 is to be indicating a next user packet 281 in the double-linked connection, as shown in a state of B in FIG. 2.

When a user packet is added and thus double-linked to a UGS 261 and a first CID 251, the double link connection is changed to a state of C in FIG. 2. In other words, a user packet 294 is added after an end user packet 293 linked to the UGS 261, and it is also added after an end user packet 292 linked to the first CID 251.

Therefore, an operation of the user packet may be varied with respect to each service class and CID.

The management message and the BR may be added or deleted in consideration of the double-linked connections with the control CHs/CIDs and the access types/CIDs similar to the link change shown in FIG. 2.

FIG. 3 shows an operational flow of a bandwidth manager of the mobile terminal according to an embodiment of the present invention.

Referring to FIG. 3, the CIDs in the double-linked lists for each management message in the queue are scanned for adding up a necessary amount of bandwidth for each CID, in Step S301.

The necessary bandwidth for each user packet is also added up by scanning each CID in the double-linked list, in Step S302.

A state of a current mobile terminal is checked as to whether the mobile terminal can request the bandwidth by using the general access, in Step S303.

When the general access type is available, a BR containing information on a sum of requested bandwidth is added to the BR list, in step S304. Herein, each BR is indexed with the general access and the corresponding CID.

When the general access request is not available, the BRs are indexed with the random access and the corresponding CID and are added to a BR list, in Step S305.

The BRs linked to the random access are sequentially extracted from the BR list and a desired bandwidth is requested by using the random access request, in Step of S306.

The BRs linked to the general access are sequentially extracted from the BR list and a desired bandwidth is requested by using the general access request, in Step S307.

A lower layer may request to change the general access request to the random access request when that piggy-backing and bandwidth stealing are determined to be unacceptable by the lower layer. Therefore, a change of the access request type for a particular BR in the BR list is checked in Step S308, and the particular BR is indexed with the random access and added to the BR list in Step S309 when the change of the access request type is requested.

FIG. 4 illustrates an operational flowchart of a priority manager of the mobile terminal according to an embodiment of the present invention.

Referring to FIG. 4, a method for managing priority of the mobile terminal provides the priority, manager with a sum of bandwidth requested during the time that the bandwidth manager is operated. Herein, a leftover bandwidth which may be produced when the sum of the requested bandwidth is greater than a sum of bandwidth through which data is transmitted in Step S401, and thus the management messages linked to the basic/primary CH are transmitted within the requested bandwidth in Step S402.

When the requested bandwidth still have the leftover bandwidth after the transmission of Step S402 in Step S403, a management message linked to the secondary CH is transmitted using the leftover bandwidth, in Step S404.

User packet transmission is then started after the transmission of the management message of Step S404. The user packets are respectively transmitted according to the prioritized order (UGS->RTPS->NRTPS->BE) in Steps S406, S408, S410, and S412 after checking whether the request bandwidth has the leftover bandwidth for each user packet in Steps S405, S407, S409, and S411.

As described, the uplink data is classified according to characteristics of the data and stored in the queue, an internal data structure is provided for ease of data extraction, and indexes such as a CID, a service class, a control CH, and an access type for the classification are provided according to the embodiments of the present invention. Elements of the indexes are double-linked for flexible addition and deletion.

Herein, the CID includes identifiers for each connection, the service class includes QoS classes, the control CH includes control CH types, and the access type includes types of BRs.

In addition, the user packets and the management messages are double-linked. Thus, each user packet is linked to the corresponding CID and service class, each management message is linked to the corresponding CID and control CH, and each BR is linked to the corresponding CID and access type.

For management of the bandwidth, the user packets and the management messages stored/queued in the data structure are scanned for each CID to calculate a desired amount of bandwidth, and each bandwidth request is classified by types of the request for the mobile terminal and stored as the BR to thereby efficiently manage the change of the bandwidth request of the mobile terminal.

For management of the priority, the stored/queued user packets and the management messages are sequentially extracted and transmitted according to the priority-based QoS policy with reference to the index (e.g., control CH, service type, etc.) within the requested bandwidth so as to enable QoS-based uplink data transmission.

Therefore, uplink data transmission in the MAC, layer of the mobile terminal may be designed and implemented in an OFDMA/TDMA-based portable Internet system according to the embodiments of the present invention.

In addition, the uplink data are linked and stored by their characteristics, and extracted to be used for managing bandwidth and priority as necessary to thereby efficiently transmit the QoS-based uplink data transmission.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. A method for managing bandwidth for quality of service (QoS)-based uplink data transmission of a mobile terminal in an orthogonal frequency division multiple access (OFDMA)/ time division multiple access (TDMA)-based high-speed portable Internet (HPi) system, the method comprising:

scanning, by the mobile terminal, management messages queued in the mobile terminal;
calculating a desired bandwidth for each connection identifier (CID) of the management messages queued in the mobile terminal;
scanning user packets queued in the mobile terminal; calculating a desired bandwidth for each CID of the user packets queued in the mobile terminal;
identifying a bandwidth request for each CID of the management messages and for each CID of the user packets as a general access type or a random access type;
storing bandwidth requests identified as the general access type in a general access type bandwidth request list;
storing bandwidth requests identified as the random access type in a random access type bandwidth request list;
performing the bandwidth requests stored in the random access type bandwidth request list prior to performing the bandwidth request stored in the general access type bandwidth request list; and
re-performing a bandwidth request for a CID when the type of bandwidth request is changed from the general access type to the random access type, wherein the management messages are linked to each other through a linked list in a management message list and are pointed by a connection identifier index indicating a predetermined connection of the mobile terminal and a control channel index indicating a type of a control channel for transmission of the management message of the mobile terminal, and
wherein the user packets are linked to each other through a linked list in a user packet list and are pointed by the connection identifier index and a service class index indicating quality of service classes of uplink data of the mobile terminal.

2. The method of claim 1, wherein re-performing the bandwidth request comprises:
checking whether an access type change from the general access type to the random access type for the CID is requested;
when the access type change is requested, changing the general access type to the random access type as an index for the bandwidth request of the CID and storing the changed access type in a queue; and
re-performing the bandwidth request by employing the random access type stored in the queue.

3. A method for managing priority of quality of service (QoS)-based uplink data transmission of a mobile terminal in an orthogonal frequency division multiple access (OFDMA)/time division multiple access (TDMA)-based high-speed portable Internet (HPi) system, the method comprising:
comparing, by the mobile terminal, a size of a bandwidth requested for management messages to be transmitted and a size of bandwidth for transmitting the management messages to be transmitted;
when the size of the requested bandwidth is greater than the size of the bandwidth for transmitting the management messages, transmitting the management messages within the requested bandwidth according to priority;
comparing a size of a bandwidth requested for user packets to be transmitted and a size of bandwidth for transmitting the user packets to be transmitted; and
when the size of the requested bandwidth for user packets is greater than the size of the bandwidth for transmitting the user packets, transmitting the user packets within the requested bandwidth according to priority,
wherein the management messages are linked to each other through a linked list in a management message list and are pointed by a connection identifier index indicating a predetermined connection of the mobile terminal and a control channel index indicating a type of a control channel for transmission of the management message of the mobile terminal, and
wherein the user packets are linked to each other through a linked list in a user packet list and are pointed by the connection identifier index and a service class index indicating quality of service classes of uplink data of the mobile terminal.

4. The method of claim 3, wherein the management messages are linked to a basic/primary channel and are transmitted prior to management messages linked to a secondary channel.

5. The method of claim 3, wherein the user packets are transmitted in order of an unsolicited grant service (UGS), a real time polling service (RTPS), a non real time polling service (NRTPS), and a best effort service (BE).

6. A non-transitory computer-readable recording medium recording a program for managing bandwidth for quality of service (QoS)-based uplink data transmission of a mobile terminal in an orthogonal frequency division multiple access (OFDMA)/time division multiple access (TDMA)-based high-speed portable Internet (HPi) system, wherein the program causes the mobile terminal to execute:
scanning management messages queued in the mobile terminal;
calculating a desired bandwidth for each connection identifier (CID) of the management messages queued in the mobile terminal;
scanning user packets queued in the mobile terminal;
calculating a desired bandwidth for each CID of the user packets queued in the mobile terminal;
identifying a bandwidth request for each CID of the management messages and for each CID of the user packets as a general access type or a random access type;
storing bandwidth requests identified as the general access type in a general access type bandwidth request list;
storing bandwidth requests identified as the random access type in a random access type bandwidth request list;
performing the bandwidth requests stored in the random access type bandwidth request list prior to performing the bandwidth request stored in the general access type bandwidth request list; and
re-performing a bandwidth request for a CID when the type of bandwidth request is changed from the general access type to the random access type,
wherein the management messages are linked to each other through a linked list in a management message list and are pointed by a connection identifier index indicating a predetermined connection of the mobile terminal and a control channel index indicating a type of a control channel for transmission of the management message of the mobile terminal, and
wherein the user packets are linked to each other through a linked list in a user packet list and are pointed by the connection identifier index and a service class index indicating quality of service classes of uplink data of the mobile terminal.

* * * * *